United States Patent [19]

Boileau

[11] Patent Number: 4,606,251
[45] Date of Patent: Aug. 19, 1986

[54] ADJUSTABLE SAWDUST SHEAR FOR BANDMILLS

[75] Inventor: Sidney N. Boileau, Surrey, Canada

[73] Assignee: CAE Machinery Ltd., Vancouver, Canada

[21] Appl. No.: 761,209

[22] Filed: Jul. 31, 1985

[51] Int. Cl.⁴ .............................................. B27B 13/00
[52] U.S. Cl. ......................................... 83/168; 83/788
[58] Field of Search ......................... 83/168, 820, 788

[56] References Cited

U.S. PATENT DOCUMENTS

| 2,741,281 | 4/1956 | Braun | 83/168 |
| 2,807,294 | 9/1957 | Brown | 83/168 |

Primary Examiner—James M. Meister
Attorney, Agent, or Firm—Townsend and Townsend

[57] ABSTRACT

A sawdust shear apparatus to enable cleaning of the band saw of a band mill. The apparatus has a shear to contact the band saw and a housing to carry the shear. A recess is formed within the housing. The apparatus has a base and a piston extends from the base and is received within the recess with a fluid tight, slidable fit. Fluid can be supplied under pressure to the recess to move the shear outwardly from the base to clean the band saw. A spring or the like urges the shear towards the base. The apparatus is effective in cleaning a band saw with very little maintenance or inspection.

7 Claims, 5 Drawing Figures

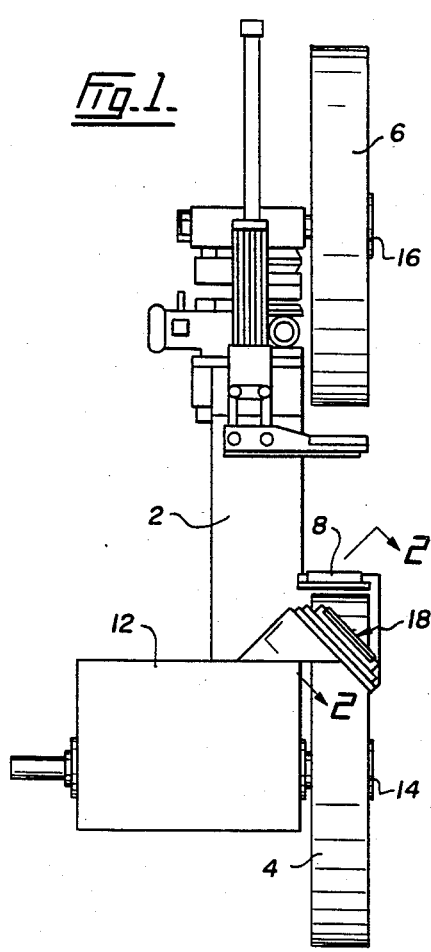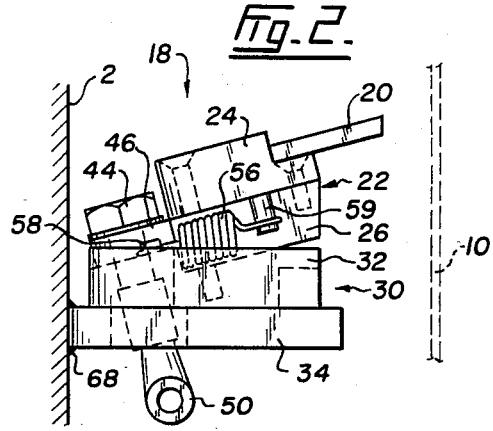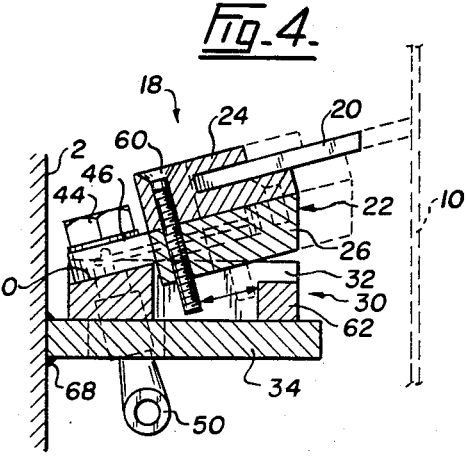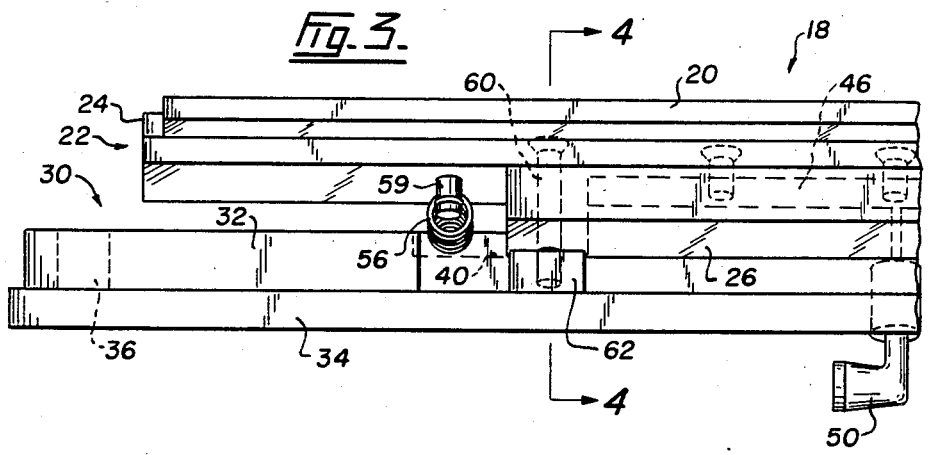

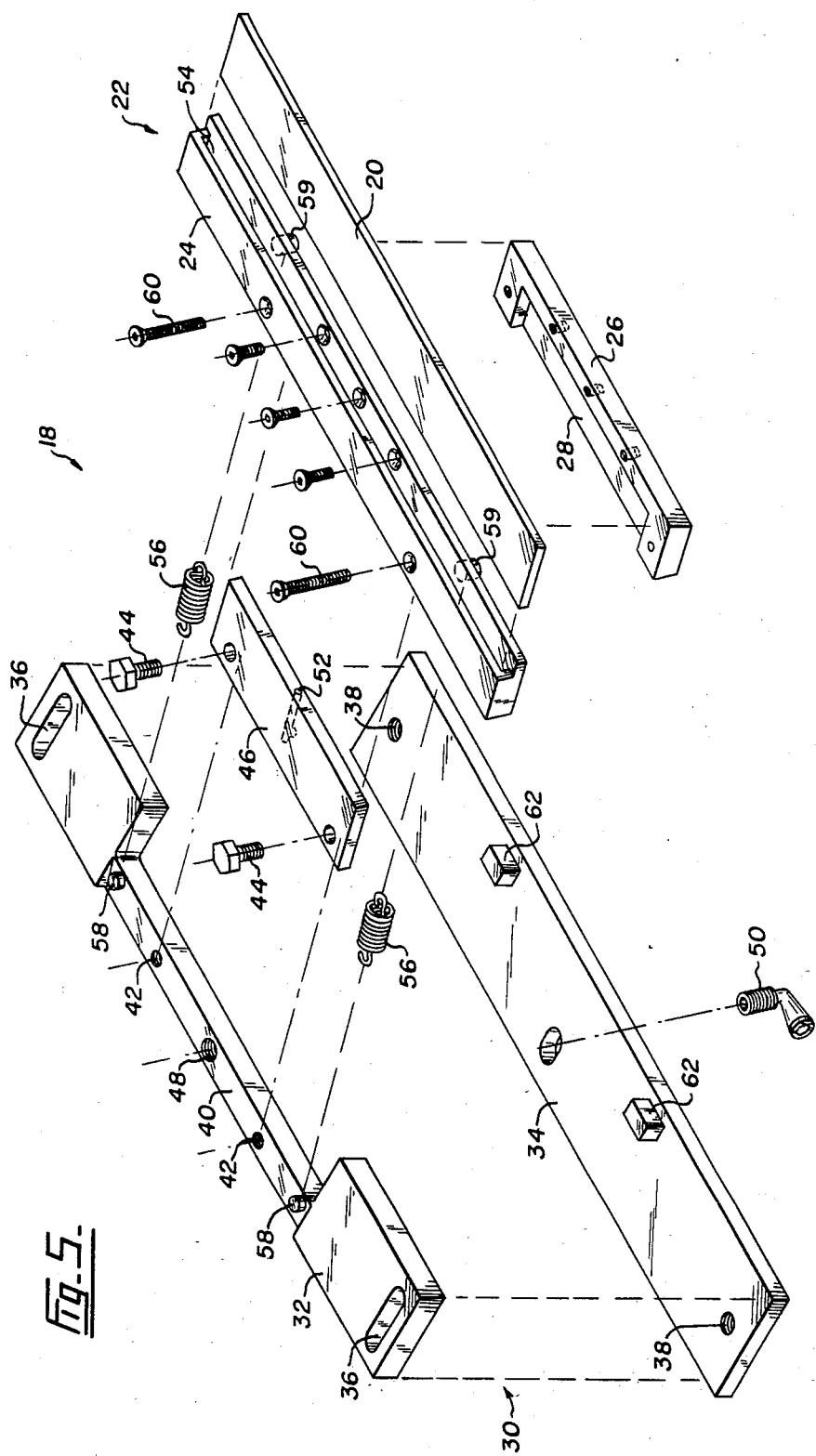

ADJUSTABLE SAWDUST SHEAR FOR BANDMILLS

FIELD OF THE INVENTION

This invention relates to a sawdust shear apparatus for cleaning the band saw of a band mill.

DESCRIPTION OF THE PRIOR ART

Sawdust shears are mounted on band mill frames, typically at 45° to the main axis of the band saw, and immediately below the bottom guide, and above the bottom wheel. The function of the shear is to remove dust, slivers of wood and the like that bypass the guide so that they do not pass between the saw and the bottom wheel. Typically such shears are manually adjusted to be kept in contact with the saw but spring loaded sawdust shears are known. Because of difficult access the manually adjusted ones are rarely adjusted, with the result that a gap is created by wear between the saw and the shear, rendering the shear partially ineffective. As a result sawdust, slivers and chunks of wood pass between the saw and wheel and cause local deformation of the saw. This can cause cracks in the saw and more maintenance as the cracks have to be repaired and the deformations flattened.

Spring loaded shears are an improvement on the manually adjusted shears but often suffer damage when a saw is being "trained". Training is the process by which a new saw is started on a band mill and the top wheel has to be adjusted to train the saw properly. During this process the saw often wanders and the gullet and the teeth can pass over the shear in unusual places, cutting the shear in those places. After this has happened the shears are only partially effective in the damaged areas.

SUMMARY OF THE INVENTION

The present invention seeks to avoid the disadvantages of the prior art by providing an adjustable shear in which fluid pressure, typically air pressure is used to extend the shear into contact with the saw blades.

Accordingly the present invention is a sawdust shear apparatus to clean the band saw of a band mill, the apparatus comprising a shear to contact the band saw; a housing to carry the shear; a first recess within the housing; a base; a piston extending from the base and being received within the first recess with a fluid tight, slidable fit; means to supply fluid under pressure to the recess to move the shear outwardly from the base; and means tending to urge the shear towards the base.

In a desired aspect the piston is of rectangular cross section, thus allowing slight changes in the angular presentation of the shear to the band saw.

DRAWINGS

Aspects of the mentioned are illustrated, merely by way of example, in the accompanying drawings in which:

FIG. 1 is a general view of a band saw fitted with a sawdust shear apparatus according to the present invention;

FIG. 2 is a view on the line 2—2 of FIG. 1;

FIG. 3 is a partial front view of the apparatus of the present invention;

FIG. 4 is a section on the line 4—4 of FIG. 3; and

FIG. 5 is an exploded view of the sawdust shear apparatus of the invention.

DESCRIPTION OF THE PREFERRED EMBODIMENTS

FIG. 1 shows a band mill and is included merely to illustrate the position of the sawdust shear apparatus in the present invention. The band mill itself is entirely conventional and comprises a frame 2, a lower wheel 4 and a top wheel 6. There is a bottom guide 8 for the saw 10 (as shown in FIG. 2) above the bottom wheel 4. The bottom wheel 4 is driven by motor 12 and is mounted on arbor 14. The upper wheel is mounted on arbor 16. As is entirely conventional the upper wheel has means for adjusting and maintaining the tension of the band saw and strain systems to protect the blade 10 which do not form any part of the present invention and will not be discussed here.

A sawdust shear apparatus 18 of the present invention is mounted on the frame 2 of the band saw immediately below bottom guide 8 at an angle of about 45° to the main axis of the band saw 10, again as is conventional in the art.

As shown in the remaining figures the sawdust shear apparatus 18 comprises a shear 20 to contact the band saw 10. There is a housing 22 to carry the shear 20. As illustrated particularly in FIG. 5 the housing is formed in two parts, an upper part 24 and a lower part 26 bolted to the upper part 24. The lower part 26 is shaped to define a first recess 28. There is a base 30 for the apparatus, formed as an upper part 32 and a lower part 34 bolted to each other by bolts extending through openings 36 in the upper part 32 into threaded openings 38 in the lower part 34. The upper part 32 is angled at its center piece 40 which is formed with threaded openings 42. The threaded openings 42 receive bolts 44 that locate a piston 46 to the central piece 40. Central piece 40 is also provided with an opening 48 that receives inlet 50, connectable to a supply of compressed gas, typically compressed air. The piston 46 is received within the recess 28 and is a gas tight slidable fit within that recess. It is desirable to provide a seal at the outer end of the piston 46 to ensure a gas-tight fit within the recess 28.

The opening 48 in the central piece 40 aligns with a passageway 52 formed in the piston 46 so that a supply of compressed air may be fed through the inlet 50, through the passageway 52 in the piston 46 and into the recess 28. By this means the housing 22 carrying the shear 20 is move outwardly as the housing slides on the piston 26. As indicated particularly in FIG. 5 the piston 46 is of rectangular cross section which ensures positioning and alignment of the housing 22 and thus of the shear 20.

The preferred embodiment illustrated has a second recess 54 in the upper part 24 of housing 22 to locate the shear, which is desirably a simple push fit within the second recess 54 to facilitate its replacement when worn.

There are means tending to urge the shear 20 towards the base 30. Those means comprise springs 56 attached to the central piece 40 of the base 30 at pins 58 and extending to engage pins 59 on the under side of upper part 24 of the housing 22. Thus the compressed gas applies pressure to recess 28 to move the housing 22 outwardly against the springs 56. As particulary shown in FIGS. 4 and 5 bolts 60 extend downwardly through the housing 22 so that, when the shear apparatus is in use, they may contact stops 62 formed on the lower part 34 of the base 30. By this means outward movement of the housing 22, and thus of the shear 20, is restricted. This arrangement is shown in FIG. 4 where the broken line position shows the fully extended position of the housing 22 and of the shear 20.

Use of the shear apparatus of the present invention is simple. Inlet 50 is connected to a supply of compressed gas and, when the band mill is in use, a gas pressure is applied to the first recess 28, moving the housing 22 outwardly on piston 46. The shear 20 is moved outwardly until it contacts the blade 10 as shown in FIG. 4. It will be appreciated that wear in the shear 20 is automatically compensated for by outward movement of the housing until the screws 60 contact the stops 62. At that point it is necessary to renew the shear 20 although further movement is possible by sliding upper part 32 of base 30 on lower part 34 by loosening the bolts engaged in openings 38 and sliding the part 32 using elongated openings 36.

Renewal of the shear 20 simply requires sliding out the old shear and replacing it with a new shear of the appropriate dimension.

A particular virtue of the present invention is that when training a saw the gas supply to the recess 28 is switched off and the housing thus moves towards the base 30 under the influence of the springs 56. The saw may then be trained without any interference by the shear or, of course, damage to the shear. When training is complete air is again supplied to the recess, moving the housing, and thus the shear, into contact with the saw.

As shown in FIGS. 2 and 4 the shear apparatus is simply mounted to the frame 2 of the band mill, for example, by welding at 68.

The shear 20 is made of materials typical in the art, for example aluminum, brass, plastic or reinforced plastic and is easily replaced when worn out. It is clear that instead of gas pressure the device may be operated hydraulically, typically water would be appropriate.

The present invention therefore provides a sawdust shear apparatus that avoids the disadvantages of the prior art in that it maintain a constant even pressure against the band saw and does not require any adjustment. In training the saw the shear can easily be moved out of contact with the saw. Replacement of the saw is a simple matter.

The device is of simple structure and able to work well and consistently in the wet and dusty, confined area of a band mill beneath the bottom guide.

I claim:

1. A sawdust shear apparatus to enable cleaning of the band saw of a band mill, the apparatus comprising:
    a shear to contact the band saw;
    a housing to carry the shear;
    a first recess within the housing;
    a base;
    a piston extending from the base and being received within the first recess with a fluid tight, slidable fit;
    means to supply fluid under pressure to the recess to move the shear outwardly from the base; and
    means tending to urge the shear towards the base.

2. Apparatus as claimed in claim 1 in which the shear is located in a second recess in the housing.

3. Apparatus as claimed in claim 1 in which the base is formed with stops;
    means on the housing to contact the stops to restrict excessive outward movement of the housing from the base.

4. Apparatus as claimed in claim 1 in which the piston is formed separately from, but rigidily attached to, the base.

5. Apparatus as claimed in claim 1 including an inlet in the base adapted to communicate with a supply of gas under pressure;
    a passageway in the piston communicating with the inlet in the base whereby the gas under pressure may pass through the inlet and through the piston to move the housing on the piston.

6. Apparatus as claimed in claim 1 in which the piston and the first recess are of rectangular cross section.

7. Apparatus as claimed in claim 1 in which the means to urge the shear towards the base comprises at least one coil spring.

* * * * *